H. HOLFORTY.
ROOT CUTTING IMPLEMENT.
APPLICATION FILED JAN. 11, 1919.
1,310,569.
Patented July 22, 1919.
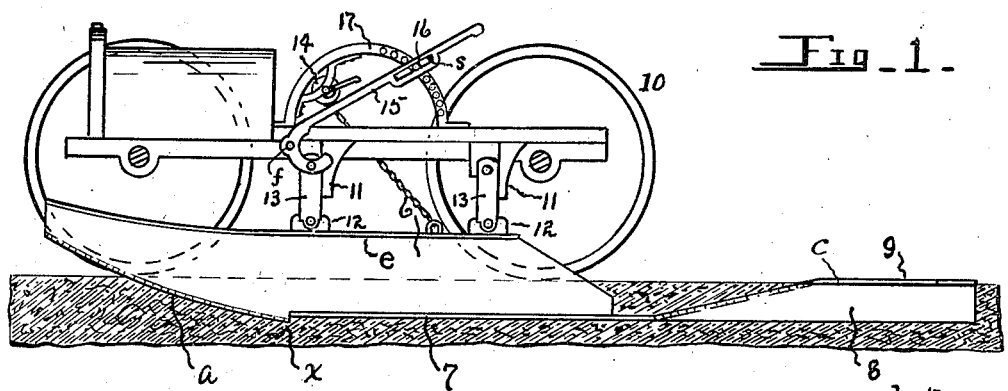
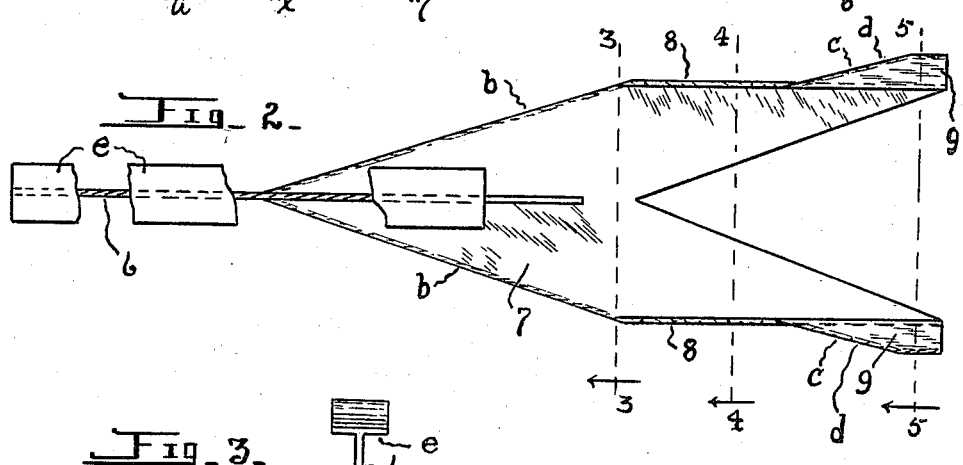
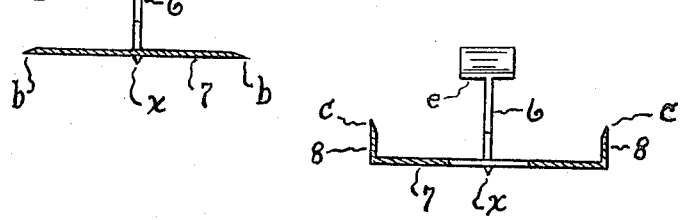
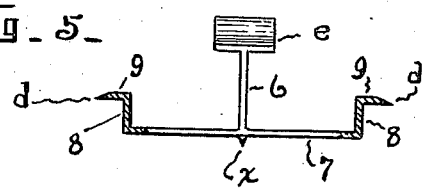
Inventor
Howard Holforty,
By Hiram A. Sturges
Attorney

UNITED STATES PATENT OFFICE.

HOWARD HOLFORTY, OF HURON, SOUTH DAKOTA.

ROOT-CUTTING IMPLEMENT.

1,310,569.  Specification of Letters Patent.  Patented July 22, 1919.

Application filed January 11, 1919. Serial No. 270,730.

*To all whom it may concern:*

Be it known that I, HOWARD HOLFORTY, a citizen of the United States, residing at Huron, in the county of Beadle and State of South Dakota, have invented certain new and useful Improvements in Root-Cutting Implements, of which the following is a specification.

This invention relates to an implement for cutting the roots of shrubs, plants or the like which are located below the surface of the ground, to facilitate removal, and includes a vertical plate provided at its lower, inclined, sharpened edge with a pair of horizontal, rearwardly divergent blades, the latter being provided with upset wings, parallel with the vertical plate, and means for moving the implement forwardly through and for maintaining it substantially at uniform distances below the surface of the ground, each wing being provided with a horizontal flange or guide tending to limit the movement of the rear end of the implement below the surface.

The invention is fully described herein and in the appended claims and is illustrated in the accompanying drawing, wherein,—

Figure 1 is a view in side elevation of the implement, a part of a vehicle being added and a section of ground being shown. Fig. 2 is a partly broken plan view of the implement. Fig. 3 is a transverse section on line 3—3 of Fig. 2. Fig. 4 is a transverse section on line 4—4 of Fig. 2. Fig. 5 is a transverse section on line 5—5 of Fig. 2.

Referring now to the drawing for a more particular description, the implement consists, in part, of an attenuated, elongated main blade or plate 6 provided with a pair of horizontal, rearwardly divergent blades 7, each having an upset wing 8 disposed parallel with the plate 6, each wing 8 being provided with a horizontal guide or flange 9.

The plate 6 is provided at its front with a curved knife-edge $a$ and its lowermost part preferably projects below the plane of the wings 7, as indicated at $x$. The blades 7 are each formed with a chisel-edge at its front as indicated at $b$, and at $c$ are indicated the edges of the wings, each being rearwardly and upwardly inclined and having a chisel-edge, and the edges of the horizontal guides or flanges 9 are inclined rearwardly and outwardly and likewise have a chisel-edge, as indicated at $d$.

Any suitable means may be provided for moving the implement or for maintaining the blades below the surface of the ground, a tractor or other heavy vehicle 10 preferably being employed to which it is secured, the tractor being driven for moving the implement forwardly, the blades 7, during operation, being disposed a few inches below the surface of the ground.

While any other suitable means may be used for this purpose, I have shown vertical bumper-blocks 11 which are secured to the frame of the tractor, the horizontal reinforcing-plate $e$ which is provided for the top of the plate 6 having brackets 12 mounted thereon, and links 13 being provided, one of which is pivotally connected with a bracket 12 near the rear end of the plate 6, and having a pivotal connection with the tractor frame, whereby the implement may be sustained in the position shown in Fig. 1, and also may be elevated to a position above the ground for removal from one place to another, a lever 15 being employed which is pivotally mounted on the frame as indicated at $f$ and is pivotally connected with a link 13, for use in a control of any longitudinal swinging movement of the implement.

In operation, the blades 7 will be maintained approximately at uniform distances below the surface of the ground and their sharpened edges, which are disposed at an acute angle to the plate 6, will sever the roots of plants, bushes or shrubs so that they may be readily removed, the edges of the wings 8 also operating to sever the roots between which they engage, the flanges or guides 9 being disposed flatwise upon the ground and operating to prevent the blades 7 from being disposed at too great a distance below the surface of the ground, which might otherwise be occasioned by a movement of the lever 15, the edges of the wings 9 tending to sever any plants or shrubs which they may engage. The plate 6, which is disposed at the medial line of the implement, will readily enter the ground by operation of the lever 15 when the tractor moves forwardly, its curved, knife-edged part *a* facilitating this operation, the projection *x* tending to prevent any transverse movement. Numeral 16 indicates a bolt or pin engaging in one of the apertures of the sector 17 and in the slot *s* of the lever, these parts being used in making the adjustments mentioned.

While I have described the edges of the blades, wings and flanges as being chisel-edged or knife-edged, it will be understood that they should be sufficiently sharpened to readily cause cutting of the roots, and I do not wish to be understood as limiting myself to exactness of the edges which sever the roots. Also it will be understood that I have shown and explained one embodiment, only, of the invention, and that minor details may be made in construction, as well as changes in form, size and proportion of parts, the scope of the disclosure being the invention as claimed.

What I claim and desire to secure by Letters Patent is,—

1. A root-cutting implement, comprising, in combination with an attenuated vertical plate having its front end curved upwardly and forwardly and provided at its lower edge with horizontal blades, each blade having a flat, upwardly projecting wing, means above the plate for pressing the implement toward the ground, one of the edges of each blade, each wing, and said plate being provided with sharpened edges, each wing being provided with a horizontal flange having a sharpened edge.

2. In a root-cutting implement, an attenuated, vertical plate having a part of its lower edge curved upwardly and forwardly and provided at its lower edge rearwardly of said curved edge with a pair of horizontal blades having their front edges extending outwardly and rearwardly, each blade having an upright wing disposed substantially parallel with the plate with its edge inclined rearwardly and upwardly, and means for vertically adjusting said plate.

3. In a root-cutting implement, a metallic plate disposed vertically and having a part of its lower edge curved upwardly and forwardly said plate being provided at its lower edge rearwardly of said curved edge with a pair of outwardly extending blades having their front edges disposed at an acute angle to said plate, each blade having an upright wing disposed substantially parallel with the plate with its edge inclined rearwardly and upwardly, each wing being provided with a horizontal flange, means for adjusting the plate vertically, the lowermost part of the curved edge of said plate being disposed in a plane below said wings.

In testimony whereof, I have affixed my signature in presence of two witnesses.

HOWARD HOLFORTY.

Witnesses:
HIRAM A. STURGES,
ARTHUR H. STURGES.

Copies of this patent may be obtained for five cents each, by addressing the "Commissioner of Patents, Washington, D. C."